United States Patent
Caprara

(10) Patent No.: US 10,983,260 B2
(45) Date of Patent: Apr. 20, 2021

(54) THIRD-HARMONIC GENERATING APPARATUS FOR LASER-RADIATION HAVING POLARIZATION LOOP

(71) Applicant: Coherent, Inc., Santa Clara, CA (US)

(72) Inventor: Andrea Caprara, Palo Alto, CA (US)

(73) Assignee: Coherent, Inc., Santa Clara, CA (US)

( * ) Notice: Subject to any disclaimer, the term of this patent is extended or adjusted under 35 U.S.C. 154(b) by 379 days.

(21) Appl. No.: 16/172,018

(22) Filed: Oct. 26, 2018

(65) Prior Publication Data
US 2020/0132906 A1 Apr. 30, 2020

(51) Int. Cl.
| | | |
|---|---|---|
| G02B 5/08 | (2006.01) | |
| G02B 5/30 | (2006.01) | |
| G02B 27/09 | (2006.01) | |
| H01S 3/00 | (2006.01) | |
| H01S 3/11 | (2006.01) | |

(52) U.S. Cl.
CPC .............. *G02B 5/3025* (2013.01); *G02B 5/08* (2013.01); *G02B 27/0977* (2013.01); *H01S 3/0085* (2013.01); *H01S 3/11* (2013.01)

(58) Field of Classification Search
CPC .... G02B 5/08; G02B 5/3025; G02B 27/0977; H01S 3/0085; H01S 3/11
See application file for complete search history.

(56) References Cited

U.S. PATENT DOCUMENTS

| | | |
|---|---|---|
| 8,373,924 B2 | 2/2013 | Starodoumov et al. |
| 9,377,667 B2 | 6/2016 | Muendel et al. |
| 9,568,803 B2 | 2/2017 | Morehead et al. |
| 2003/0142703 A1 | 7/2003 | Gao et al. |
| 2005/0078718 A1 | 4/2005 | Spinelli et al. |
| 2017/0219912 A1 | 8/2017 | Morehead et al. |
| 2018/0017841 A1 | 1/2018 | Muendel et al. |

OTHER PUBLICATIONS

International Search Report and Written Opinion received for PCT Patent Application No. PCT/US2019/055243, dated Jan. 21, 2020, 11 pages.

*Primary Examiner* — Ryan S Dunning
(74) *Attorney, Agent, or Firm* — Morrison & Foerster LLP

(57) ABSTRACT

A third-harmonic conversion arrangement includes a second-harmonic generating crystal and a third-harmonic generating crystal arranged in a polarization loop. The polarization loop, which includes a plurality of mirrors, a polarization-selective reflector, and a polarization rotator, causes plane-polarized fundamental-wavelength radiation being converted to make two passes through the crystals in orthogonally-opposed polarization orientations.

19 Claims, 3 Drawing Sheets

US 10,983,260 B2

THIRD-HARMONIC GENERATING APPARATUS FOR LASER-RADIATION HAVING POLARIZATION LOOP

TECHNICAL FIELD OF THE INVENTION

The present invention relates in general to frequency-conversion apparatus for generating ultraviolet laser-radiation. The invention relates in particular to frequency-conversion apparatus in which the ultraviolet radiation is generated by sum-frequency mixing fundamental radiation from an optically-pumped solid-state laser with radiation generated by second-harmonic conversion of the fundamental radiation.

DISCUSSION OF BACKGROUND ART

In solid-state laser systems for providing ultraviolet (UV) wavelength radiation, it is usual to generate the UV radiation by harmonic conversion of visible-wavelength radiation in an optically nonlinear crystal. By way of example, in one common arrangement for providing UV radiation, fundamental-wavelength radiation is generated by an optically-pumped solid-state laser that has a near-infrared wavelength. The visible radiation is generated by second-harmonic conversion of the fundamental radiation in a first optically nonlinear crystal. The visible radiation has the second-harmonic wavelength of the fundamental radiation. This second-harmonic conversion is less than 100% efficient. Residual (unconverted) fundamental radiation from the second-harmonic conversion and the visible radiation generated by the second-harmonic conversion are then converted to UV radiation by sum-frequency mixing in a second optically nonlinear crystal. The UV radiation has the third-harmonic wavelength of the fundamental radiation.

A particular shortcoming of the above-described arrangement is that the power of the UV radiation is clamped with respect to scaling the power of the fundamental radiation. The reason for this clamping is that the optimum power ratio between the visible radiation and the fundamental radiation for sum-frequency mixing is about 2:1, due to energy conservation. As the power of the fundamental radiation is increased, the efficiency of second-harmonic conversion of the fundamental radiation to visible radiation initially increases quadratically and then asymptotically, until essentially all of the fundamental radiation is converted into visible radiation. Meanwhile, the efficiency of sum-frequency mixing increases to a peak efficiency at a fundamental radiation power corresponding to about 67% second-harmonic conversion efficiency, then declines. This decline due to energy conservation, which limits the overall conversion of the fundamental radiation to UV radiation.

Absolute values of the efficiencies for second-harmonic generation to produce visible radiation and third-harmonic generation to produce UV radiation are dependent, inter alia, on the material the optically nonlinear crystals are made of, the intensity of the radiation in the optically nonlinear crystals, and the wave-front planarity of the radiation in the optically nonlinear crystals.

There is a need for an optical arrangement that will allow a more progressive increase in third-harmonic generation efficiency with increasing power of fundamental radiation. Preferably, the arrangement should provide higher third-harmonic generation efficiencies that are more comparable with second-harmonic conversion efficiencies.

SUMMARY OF THE INVENTION

In one aspect, optical apparatus in accordance with the present invention for generating third-harmonic radiation from plane-polarized fundamental radiation comprises a polarization loop that includes a plurality of mirrors, a polarization-selective reflector, and a polarization rotator. The polarization loop is arranged such that the fundamental radiation enters the loop via the polarization-selective reflector, makes a first circuit of the loop, makes a second circuit of the loop, and then exits the loop via the polarization-selective reflector. At each location on the loop the fundamental radiation on the first circuit of the loop has a polarization orientation that is orthogonal to the polarization orientation of the fundamental radiation on the second circuit of the loop. The polarization rotator rotates the polarization of the fundamental radiation between the first orientation and the second orientation. First and second optically nonlinear crystals are located in the polarization loop. The first optically nonlinear crystal is arranged to generate second-harmonic radiation by frequency doubling fundamental radiation on the second circuit of the loop. The second optically nonlinear crystal is arranged to generate the third-harmonic radiation by sum-frequency mixing second-harmonic radiation generated in the first optically nonlinear crystal and fundamental radiation on the first circuit of the loop.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
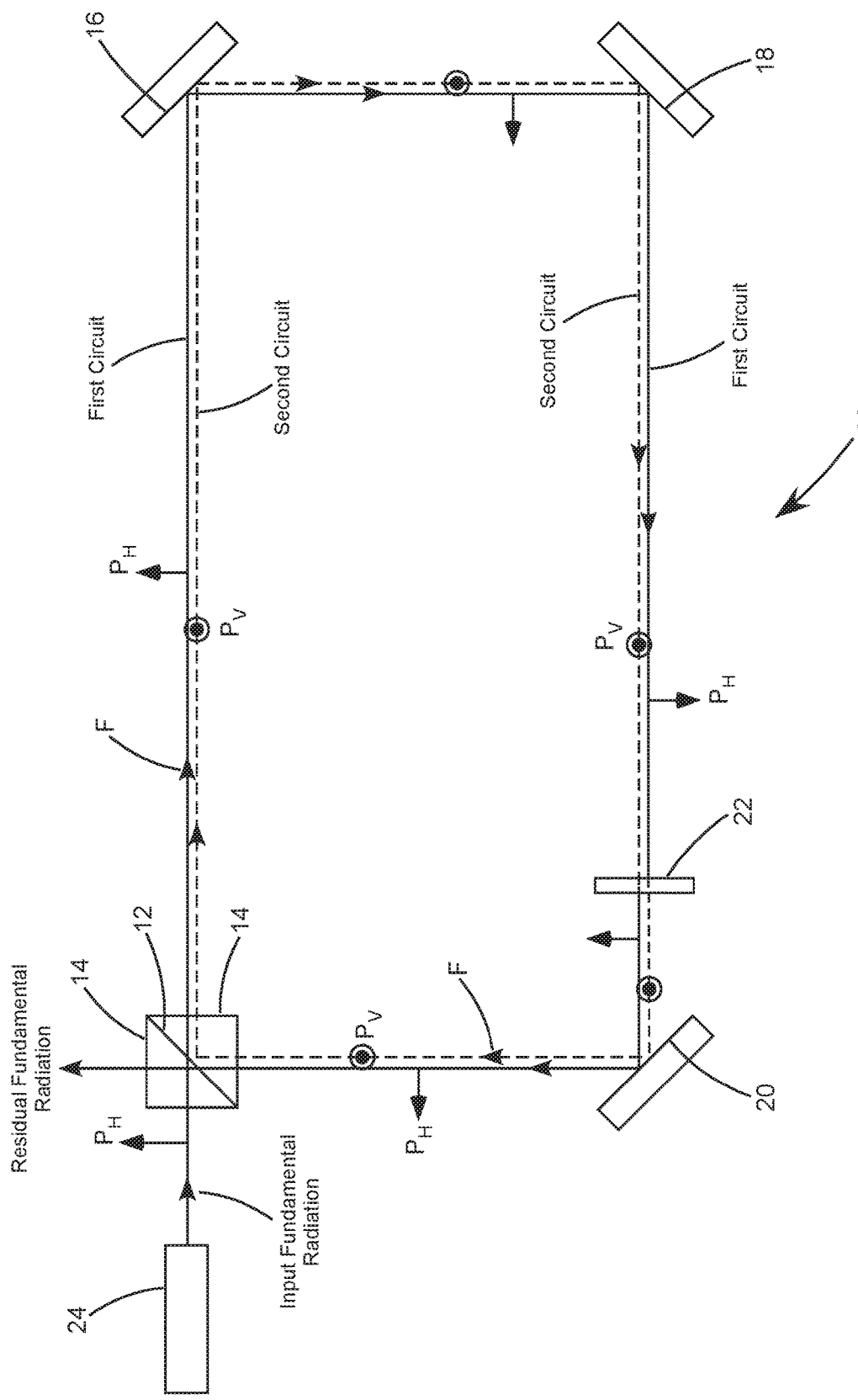
FIG. 1 schematically illustrates a polarization loop in accordance with the present invention formed by a polarization-selective reflector, three mirrors, and a polarization rotator, which are configured such that plane-polarized fundamental radiation entering the loop through the polarization-selective reflector makes two complete circuits of the loop, while at each location on the loop the fundamental radiation has one polarization orientation during the first circuit of the loop and an orthogonal polarization during the second circuit of the loop.

Turning now to the drawings, wherein like features are designated by like reference numerals, FIG. 1 schematically illustrates an example of a polarization loop 10 for a third-harmonic conversion apparatus in accordance with the present invention. Polarization loop 10 is formed by a polarization-selective reflector 12, a mirror 16, a mirror 18, a mirror 20, and a polarization rotator 22. The polarization-selective reflector, here, has the form of a pair of cemented prisms 14.

Plane-polarized fundamental radiation having a near-infrared wavelength, generated by a source 24 thereof, enters into polarization loop 10 via polarization-selective reflector 12. The polarization loop is arranged such that the fundamental radiation circulates around the loop, directed by polarization-selective reflector 12, mirror 16, mirror 18, and mirror 20 in consecutive order. The fundamental radiation makes two circuits around the loop before exiting via polarization-selective reflector 12.

Propagation of the fundamental radiation is indicated by single arrow heads "F". Within the polarization loop the two circuits (indicated as "First Circuit" and "Second Circuit") are depicted spaced-apart for convenience of illustration. In practice, however, the two circuits are collinear. To aid interpretation, arrow heads "F" of the first circuit are depicted leading arrow heads of the second circuit.

The plane-polarized fundamental radiation enters polarization loop 10 with a horizontal polarization orientation, here, in the plane of the drawing and indicated by arrows $P_H$. This plane-polarized fundamental radiation is P-polarized with respect to polarization-selective reflector 12. The path of horizontally-polarized radiation within polarization loop 10 (whether on the first or second circuit) is depicted by a solid line.

The horizontally-polarized fundamental-radiation is reflected from mirrors 16 and 18 and is then incident on polarization rotator 22. By way of example, polarization rotator 22 could be a half-wave plate for the near-infrared wavelength, with the fast axis thereof oriented at 45° with respect to the incident polarization of the fundamental radiation. Alternatively, a crystalline quartz rotator may be used. Polarization rotator 22 rotates the polarization orientation of the fundamental radiation by 90° such that the fundamental radiation becomes vertically plane-polarized with respect to the drawing, as indicated by arrowheads $P_V$. The path of vertically-polarized radiation within polarization loop 10 (whether on the first or second circuit) is depicted by a dashed line. It can be seen that, at each location on the polarization loop, fundamental radiation on the first circuit is always in a polarization orientation orthogonal to the polarization orientation on the second circuit. Between the polarization-selective reflector and the polarization rotator, the fundamental radiation is plane-polarized in a first orientation on the first circuit of the polarization loop and in a second orientation that is orthogonal to the first orientation on the second circuit of the polarization loop. The polarization rotator rotates the polarization of the fundamental radiation between the orthogonal orientations.

The vertically-polarized radiation is incident on mirror 20 and is directed by mirror 20 to polarization-selective reflector 12. In this vertical polarization orientation, the fundamental radiation is S-polarized with respect to polarization-selective reflector 12. Accordingly, this vertically-polarized radiation is reflected from polarization-selective reflector 12 to make the second circuit through polarization loop 10.

On the second circuit, the polarization-orientation of the fundamental radiation is again rotated by 90° by polarization rotator 22, such that the fundamental-radiation becomes horizontally plane-polarized with respect to the drawing as indicated by arrowheads $P_H$. The fundamental-radiation is thus P-polarized with respect to polarization-selective reflector 12. Accordingly, this horizontally polarized radiation is transmitted through polarization-selective reflector 12 and exits polarization loop 10. Overall, fundamental radiation that is not lost through interaction with the components of the polarization loop makes two complete circuits and experiences two 90° rotations in polarization.

It should be noted, here, that the foregoing description of FIG. 1 is presented from the point-of-view of a single photon of fundamental radiation, for convenience of description. In practice, a pulse of fundamental radiation having a plurality of photons is delivered to the loop, with the pulse having a duration several times greater than the round-trip time for a single photon. Accordingly, during passage of the pulse through the loop, there will be fundamental radiation on both circuits simultaneously.

Those skilled in the art will recognize that other forms of polarization loops may be used to provide the two circuits for the fundamental radiation, without departing from the spirit and scope of the present invention. By way of example, the loop may be formed by four mirrors with fundamental radiation entering and exiting the loop via a polarization-selective reflector that is located between two of the mirrors. In this case, fundamental radiation injected into the loop would be S-polarized with respect to the polarization-selective reflector. The polarization selective reflector could be a pair of cemented prisms, a thin-film coated mirror, or a Brewster plate.

Figure 2:
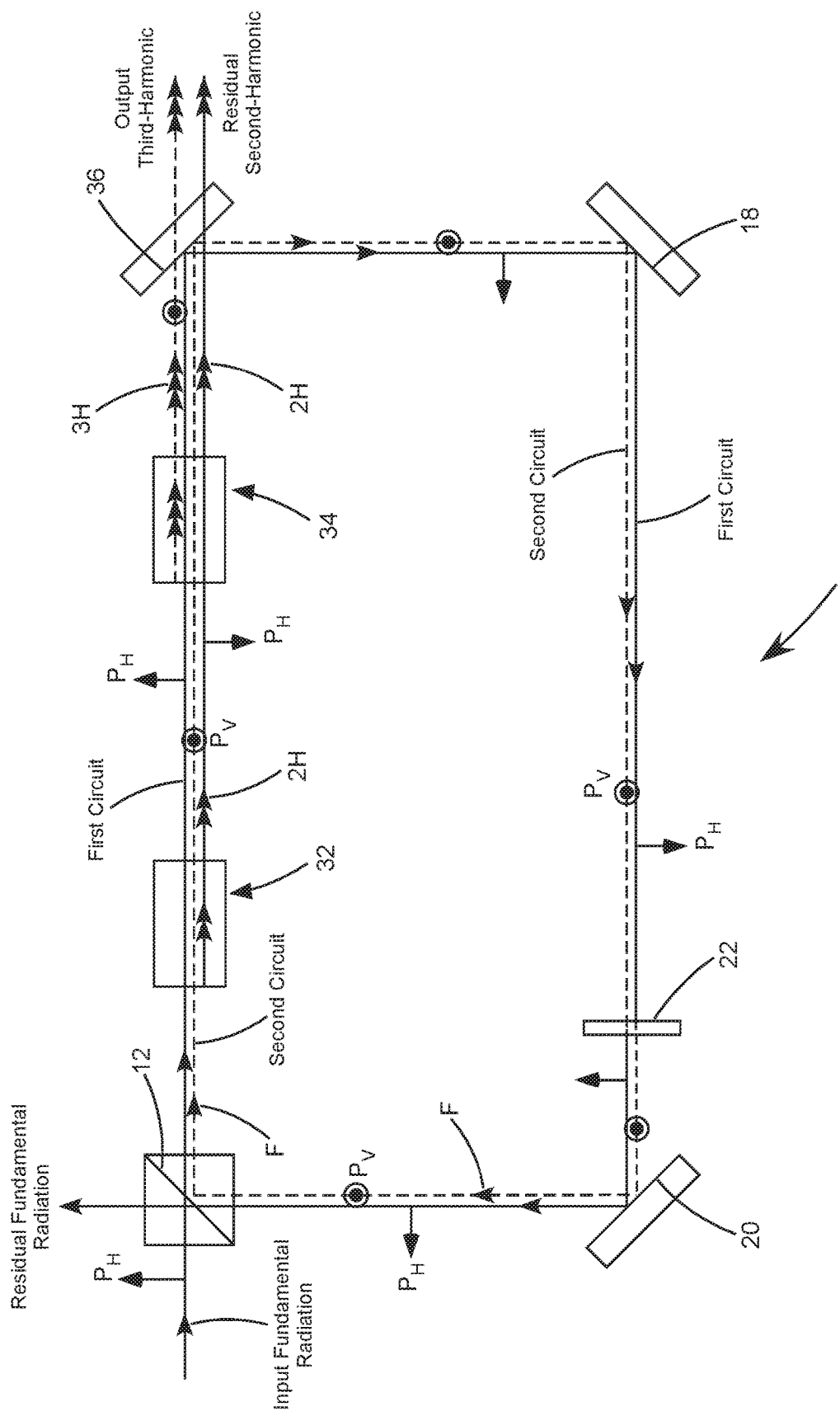
FIG. 2 schematically illustrates a preferred embodiment of third-harmonic generating apparatus, including the polarization loop of FIG. 1, with one of the mirrors being a dichroic reflector, and further including first and second optically nonlinear crystals located between the polarization-selective reflector and the dichroic reflector, the first optically nonlinear crystal arranged for frequency doubling the fundamental radiation and the second optically nonlinear crystal arranged for sum-frequency mixing the fundamental radiation and the frequency-doubled radiation.

FIG. 2 schematically illustrates a preferred embodiment 30 of third-harmonic generating apparatus in accordance with the present invention, which includes the polarization loop of FIG. 1. An optically nonlinear crystal 32 and an optically nonlinear crystal 34 are located between polarization-selective reflector 12 and a dichroic reflector 36. Here, "dichroic reflector" refers to a thin-film dielectric coating on a substrate that selectively reflects some ranges of wavelength and polarization, and selectively transmits other ranges of wavelength and polarization.

Fundamental radiation circulating in the polarization loop passes consecutively through optically nonlinear crystal 32 and optically nonlinear crystal 34. The path of second-harmonic radiation is depicted by double arrows 2H. The path of third-harmonic radiation is depicted by triple arrows 3H. Again, it should be noted that the radiation paths are depicted spaced apart. However, in practice, the radiation paths overlap. Source of fundamental radiation 24 has been omitted from FIG. 2 for clarity of illustration.

Those skilled in the art will recognize that, in practice, there would typically be focusing optics provided for focusing radiation to be frequency converted in the optically nonlinear crystals. Such focusing optics for optically nonlinear crystals are well known in the art and a detailed description thereof is not necessary for understanding principles of the present invention. Accordingly, such optics are not depicted in FIG. 2 for simplicity of illustration.

Optically nonlinear crystal 32 is arranged for type-1 frequency doubling (second-harmonic generation) of fundamental radiation that is vertically polarized $P_V$. Optically nonlinear crystal 34 is arranged for type-1 sum-frequency mixing (third-harmonic generation) of fundamental radiation and second-harmonic radiation that is horizontally polarized $P_H$. On the first pass of the fundamental radiation through crystal 32, no second-harmonic radiation is generated, as the fundamental radiation is horizontally polarized $P_H$. Second-harmonic radiation is generated on the second pass of the fundamental radiation through crystal 32, during the second circuit around polarization loop 10, when the fundamental radiation has been rotated to vertical polarization $P_V$ by polarization rotator 22.

The second-harmonic radiation generated by optically nonlinear crystal 32 is horizontally polarized $P_H$ and is therefore aligned with the polarization of fundamental radiation making a first pass through optically nonlinear crystal 34. Optically nonlinear crystal 34 generates third-harmonic radiation from the second-harmonic radiation and the fundamental radiation making a first pass. The third-harmonic radiation is vertically polarized $P_V$. Again, it should be noted that during passage of a pulse of fundamental radiation through the polarization loop, there will be fundamental radiation propagating on both circuits, with second-harmonic radiation and third-harmonic radiation being generated simultaneously.

Dichroic reflector 36 is optically coated to maximally reflect fundamental radiation and maximally transmit third-harmonic radiation that is vertically polarized $P_V$. FIG. 2 depicts dichroic reflector 36 as optically coated to transmit second-harmonic radiation that is horizontally polarized $P_H$. Residual second-harmonic radiation could be separated from output third-harmonic radiation by an additional dichroic mirror (not shown). Alternatively, dichroic reflector 36 could be optically coated to reflect second-harmonic radiation that is horizontally polarized $P_H$, thereby separating residual second-harmonic radiation from output third-harmonic radiation. Mirror 18 could be coated to transmit second-harmonic radiation that is horizontally polarized $P_H$ and thereby allow residual second-harmonic radiation to exit the polarization loop.

The arrangement of FIG. 2 overcomes the deficiencies of conventional third-harmonic conversion schemes, discussed above, in that the full power of the input fundamental radiation is available for sum-frequency mixing in crystal 34. In conventional schemes, the fundamental radiation available for sum-frequency mixing is a residual of the input fundamental radiation, which has been depleted by the second-harmonic generation.

In the inventive scheme, the second-harmonic radiation is generated from fundamental radiation that has been depleted by third-harmonic generation in crystal 34. However, only about one third of the third-harmonic power is provided by the fundamental radiation, with the remainder provided by the second-harmonic radiation. Accordingly, for every watt of third-harmonic radiation generated, the fundamental radiation is depleted by only one third of a watt. In a conventional scheme, every watt of second-harmonic radiation generated depletes the fundamental radiation by one watt.

Figure 3:
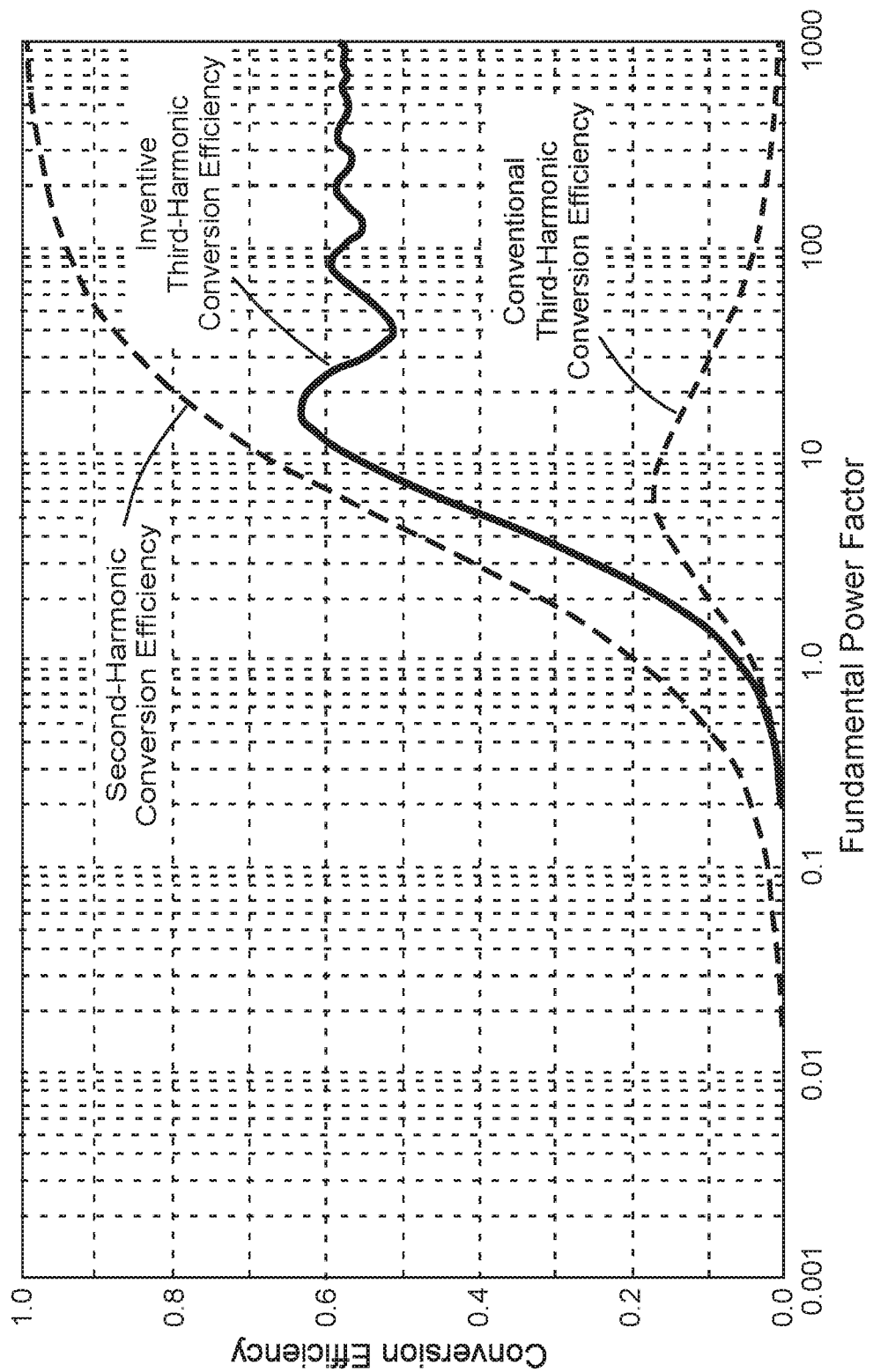
FIG. 3 is a graph schematically depicting computed relative second-harmonic and third-harmonic conversion efficiencies for an example of the inventive third-harmonic conversion arrangement of FIG. 2 compared with a conventional prior-art arrangement.

A resulting increase in overall third-harmonic generation efficiency is depicted graphically in FIG. 3, for an example of the inventive third-harmonic conversion arrangement of FIG. 2, which is compared with an equivalent conventional prior-art arrangement. FIG. 3 schematically depicts computed relative second-harmonic and third-harmonic conversion efficiencies as a function of the input fundamental-radiation power, expressed as a fundamental power factor and described below. The second-harmonic conversion efficiency and the conventional third-harmonic conversion efficiency are depicted by dashed curves. The inventive third-harmonic conversion efficiency is depicted by a bold solid curve.

It is assumed in the calculation that the input fundamental radiation being harmonically converted is delivered as a laser-pulse having a duration of about 70 nanoseconds (ns). Such a pulse would have a spatial length of greater than about 20 meters (m). A practical round trip length for the inventive polarization loop is about 1.0 m. The fundamental power factor is assumed to be a peak power-density divided by the power-density that would provide 50% efficiency of a continuous-wave flat-top beam. The peak power-density would typically occur near the temporal center of the pulse and correspond to about the spatial center of the beam. The efficiencies depicted in the graph of FIG. 3 are calculated from the following equations integrated over the duration of the pulse and over the spatial profile of the beam, which is assumed to be Gaussian:

$$I_{SHG} = \left(I_F - \frac{I_{THG}}{3}\right) \cdot \left(\tanh\left(\sqrt{\frac{\beta \cdot (I_F - I_{THG})}{3}}\right)\right)^2 \quad (1)$$

$$I_{THG} = 3 \cdot I_F \cdot \left(JacobiSN\left(\sqrt{\frac{\gamma \cdot I_F \cdot I_{SHG}}{3}}, \frac{2 \cdot I_F}{I_{SHG}}\right)\right)^2 \quad (2)$$

where JacobiSN is a Jacobi elliptic function. $I_{SHG}$ and $I_{THG}$ are the intensities of the second-harmonic and third-harmonic beams, respectively, for a given fundamental-radiation intensity ($I_{IR}$). $\beta$ and $\gamma$ are second-harmonic and third-harmonic conversion efficiencies, respectively, determined by the selections of crystal material and crystal length.

It can be seen from the calculations depicted in the graph that, for the exemplary pulse-duration, the inventive apparatus provides a significantly-higher maximum third-harmonic conversion efficiency compared with the conventional harmonic-conversion arrangement. Further, the calculations indicate that having reached a maximum, the third-harmonic conversion efficiency does not decline significantly with increasing input fundamental-radiation power after that maximum is reached.

An experiment was carried out in an example of the inventive apparatus to test the theoretical indication. A beam of near-infrared fundamental radiation was provided by a (Nd:YAG) laser delivering radiation at a wavelength of 1064 nm as pulses having 70 ns duration at a pulse-repetition frequency of 10,000 pulses per second. The beam quality factor ($M^2$) of the laser beam was 35. Average power of this input fundamental radiation was about 370 W, with a peak power about 0.5 megawatts. Second-harmonic radiation at 532 nm was generated in a lithium triborate (LBO) crystal having a length of about 40 mm. Third-harmonic radiation at 355 nm was generated in a LBO crystal having a length of about 14 mm. The fundamental-radiation was focused to a beam-waist diameter in the second-harmonic generating crystal of about 600 micrometers ($\mu$m). The beam waist diameter in the third-harmonic generating crystal was also about 600 $\mu$m.

Third-harmonic radiation having an average power of 25 W was generated using the inventive apparatus. Third-harmonic radiation having an average power of 16.5 W was generated using a conventional apparatus, with the same input fundamental radiation and the same crystal specifications. Accordingly, the inventive apparatus generated more third-harmonic power by a factor of 1.5.

The operation of the inventive third-harmonic generating apparatus is described above for pulses that have a duration longer than the round-trip time of the polarization loop, which is necessary for fundamental radiation in the first and second circuits to overlap while passing through the first and second nonlinear crystals. For example, the round-trip time for a 1 m circumference loop is about 3.3 ns, therefore a pulse duration of greater than about 10 ns is preferable for efficient harmonic conversion. That is, a pulse duration of greater than three times the round-trip time. The inventive apparatus can be used for a beam of ultrashort pulses having much shorter durations, provided the pulses are delivered synchronously with the round-trip time, which means a pulse passes through a nonlinear crystal in a second circuit while the next pulse is passing through the nonlinear crystal in a first circuit. By way of example, efficient harmonic generation is possible for ultrashort pulses having durations of less than about 50 picoseconds in the exemplary 1 m circumference loop, provided the ultrashort pulses have a temporal separation of about 3.33 ns or equivalently a pulse repetition rate of about 300 megahertz. In practice, the circumference of the loop could be adjusted such the round-trip time of the loop is synchronous with the source of laser pulses.

In summary, the inventive third-harmonic generating apparatus includes a second-harmonic generating crystal and a third-harmonic generating crystal arranged in a polarization loop. The polarization loop is configured to cause the plane-polarized fundamental radiation to make two passes through the harmonic-generating crystals in orthogonal polarization-orientations, with the full power of the input fundamental radiation passing through the third-harmonic generating crystal and polarized for third-harmonic generation. The inventive apparatus is described above with reference to a preferred embodiment. The apparatus is not limited, however, to the embodiment described and depicted herein. Rather, the invention is limited only by the claims appended hereto.

What is claimed is:

1. Optical apparatus for generating third-harmonic radiation from plane-polarized fundamental radiation, comprising:
   a polarization loop including a plurality of mirrors, a polarization-selective reflector and a polarization rotator, the polarization loop arranged such that the fundamental radiation enters the loop via the polarization-selective reflector, makes a first circuit of the loop, makes a second circuit of the loop, and then exits the loop via the polarization-selective reflector, at each location on the loop the fundamental radiation on the first circuit of the loop having a polarization orientation orthogonal to the polarization orientation of the fundamental radiation on the second circuit of the loop, the polarization rotator rotating the polarization of the fundamental radiation between the orthogonal polarization orientations; and
   first and second optically nonlinear crystals located in the polarization loop, the first optically nonlinear crystal arranged to generate second-harmonic radiation by frequency doubling fundamental radiation on the second circuit of the loop, and the second optically nonlinear crystal arranged to generate the third-harmonic radiation by sum-frequency mixing second-harmonic radiation generated in the first optically nonlinear crystal and fundamental radiation on the first circuit of the loop.

2. The apparatus of claim 1, wherein the frequency doubling is type-1 and the sum-frequency mixing is type 1.

3. The apparatus of claim 1, wherein the full power of the fundamental radiation is available for the third-harmonic generation and fundamental radiation depleted by the third-harmonic generation is used to generate the second-harmonic radiation.

4. The apparatus of claim 1, wherein the plurality of mirrors includes first, second and third mirrors numbered in consecutive numerical order from the polarization-selective reflector in the direction of circulation of the fundamental radiation, and wherein the first and second optically nonlinear crystals are located between the polarization-selective reflector and the first mirror, the first optically nonlinear crystal being closest to the polarization-selective reflector.

5. The apparatus of claim 4, wherein the first mirror is a dichroic reflector arranged to reflect the fundamental radiation and transmit the second-harmonic radiation and the third-harmonic radiation.

6. The apparatus of claim 1, wherein the fundamental radiation is near-infrared radiation.

7. The apparatus of claim 1, wherein the fundamental radiation has a wavelength of 1064 nanometers, the second-harmonic radiation has a wavelength of 532 nanometers, and the third-harmonic radiation has a wavelength of 355 nanometers.

8. The apparatus of claim 1, wherein the fundamental radiation is a pulse.

9. The apparatus of claim 8, wherein the pulse has a duration of greater than three times a round-trip time of the polarization loop.

10. The apparatus of claim 8, wherein the pulse has a duration of less than about 50 picoseconds.

11. The apparatus of claim 1, wherein the fundamental radiation is a beam of ultrashort pulses, a round-trip time of the loop being synchronous with a pulse repetition rate of the ultra short pulses.

12. Optical apparatus for generating third-harmonic radiation from plane-polarized fundamental radiation, comprising:
   a polarization loop including a plurality of mirrors, a polarization-selective reflector and a polarization rotator, the polarization loop arranged such that the fundamental radiation enters the loop via the polarization-selective reflector, makes a first circuit of the loop, makes a second circuit of the loop, and then exits the loop via the polarization-selective reflector, the fundamental radiation plane-polarized in a first orientation on the first circuit of the loop between the polarization-selective reflector and the polarization rotator, the fundamental radiation polarized in a second orientation orthogonal to the first orientation on the second circuit of the loop between the polarization-selective reflector and the polarization rotator, the polarization rotator rotating the polarization of the fundamental radiation between the first orientation and the second orientation; and
   first and second optically nonlinear crystals located in the polarization loop between the polarization-selective reflector and the polarization rotator, the first optically nonlinear crystal arranged to generate second-harmonic radiation by frequency doubling fundamental radiation on the second circuit of the loop, and the second optically nonlinear crystal arranged to generate the third-harmonic radiation by sum-frequency mixing second-harmonic radiation generated in the first optically nonlinear crystal and fundamental-wavelength radiation on the first circuit of the loop.

13. The apparatus of claim 12, wherein the frequency doubling is type-1 and the sum-frequency mixing is type 1.

14. The apparatus of claim 12, wherein the full power of the fundamental radiation is available for the third-harmonic generation and fundamental radiation depleted by the third-harmonic generation is used to generate the second-harmonic radiation.

15. The apparatus of claim 12, wherein the plurality of mirrors includes first, second and third mirrors numbered in consecutive numerical order from the polarization-selective reflector in the direction of circulation of the fundamental radiation, and wherein the first and second optically nonlinear crystals are located between the polarization-selective reflector and the first mirror, the first optically nonlinear crystal being closest to the polarization-selective reflector.

16. The apparatus of claim 12, wherein the fundamental radiation is a pulse.

17. The apparatus of claim 16, wherein the pulse has a duration of greater than three times a round-trip time of the polarization loop.

18. The apparatus of claim 16, wherein the pulse has a duration of less than about 50 picoseconds.

19. The apparatus of claim 12, wherein the fundamental radiation is a beam of ultrashort pulses, a round-trip time of the loop being synchronous with a pulse repetition rate of the ultrashort pulses.

* * * * *